June 1, 1926.
A. M. GRAVES
1,587,116
SHOCK ABSORBER FOR VEHICLES
Filed Jan. 26, 1925    3 Sheets-Sheet 1
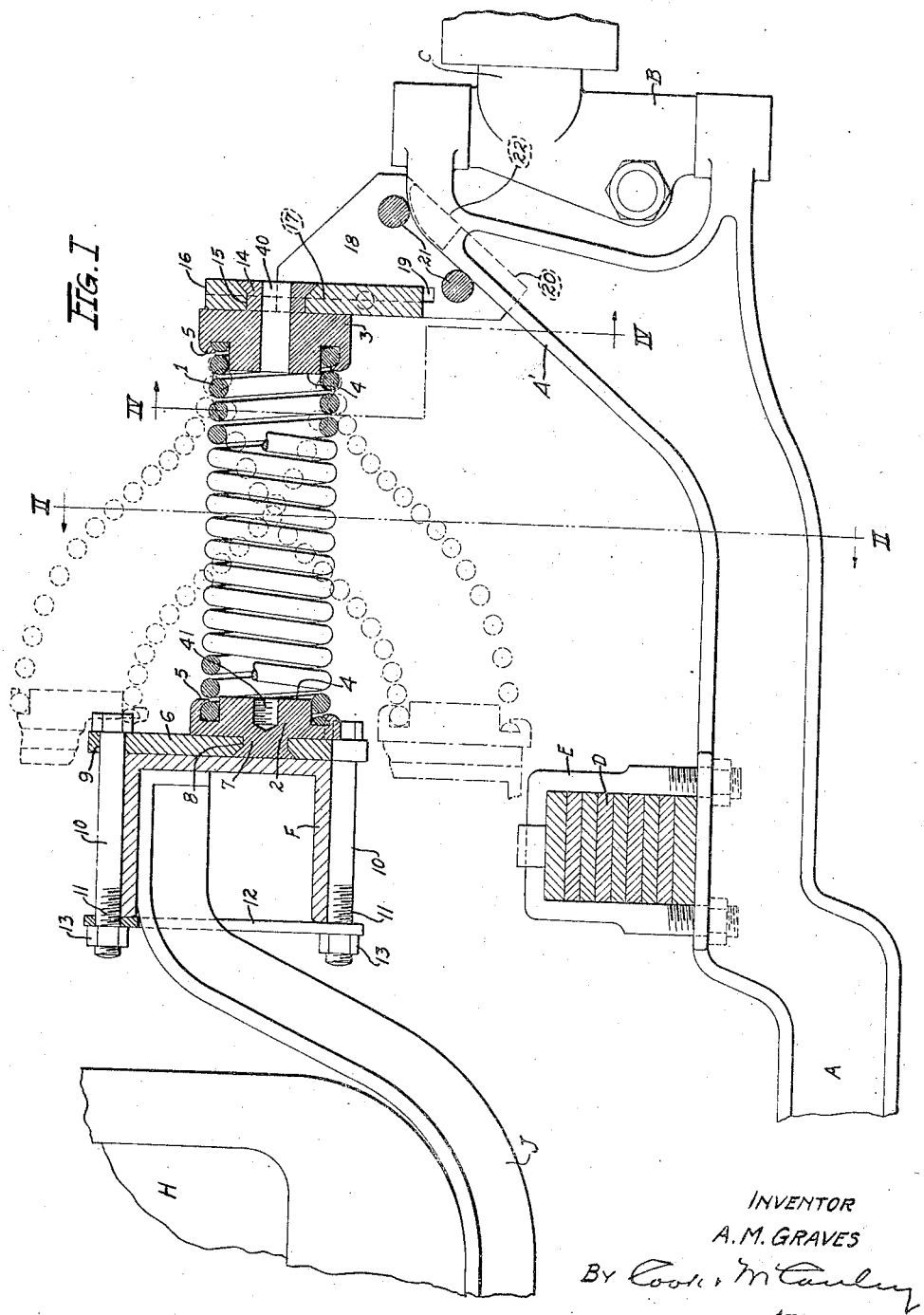
INVENTOR
A. M. GRAVES
By Cook & McCauley
ATTORNEYS

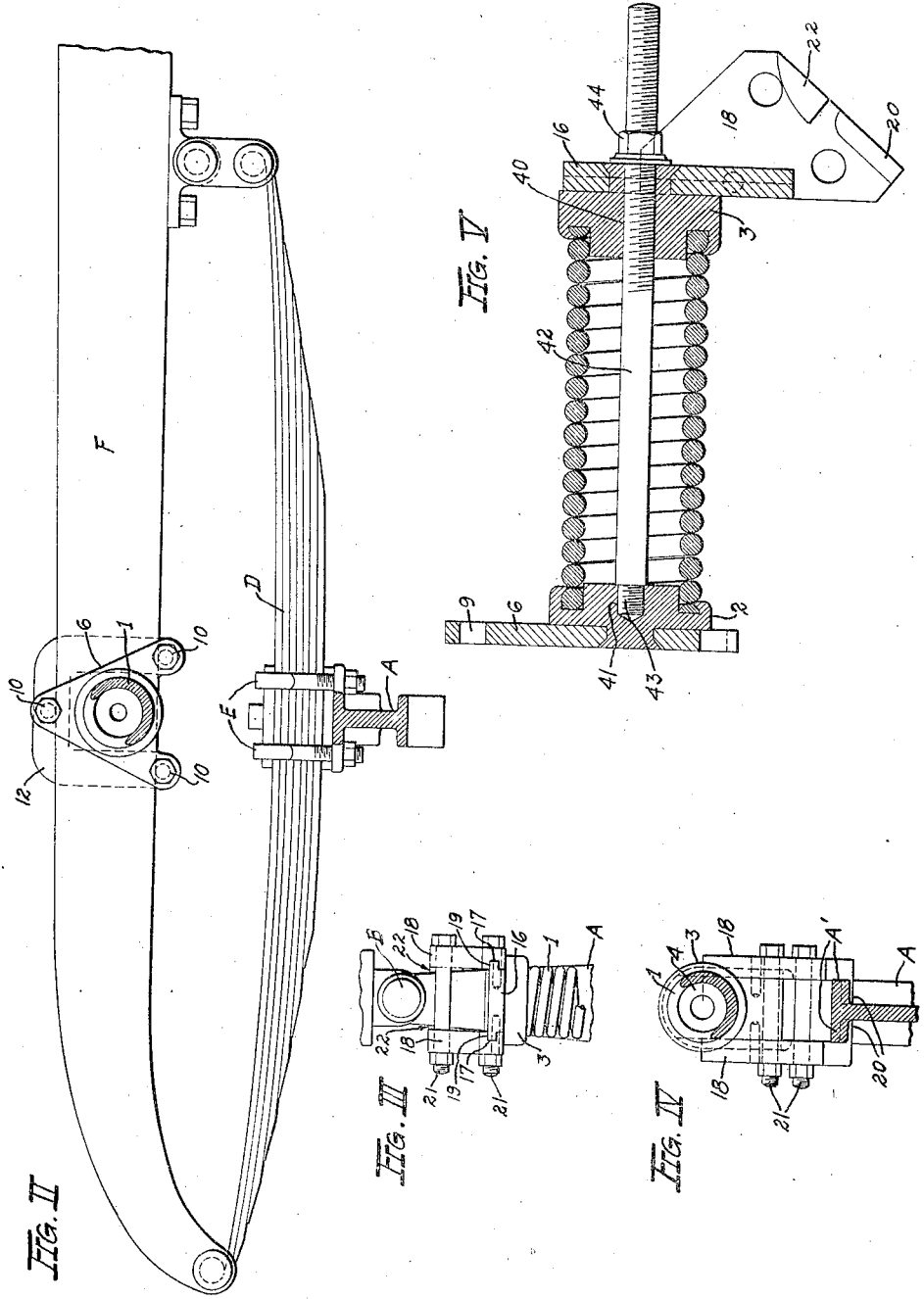

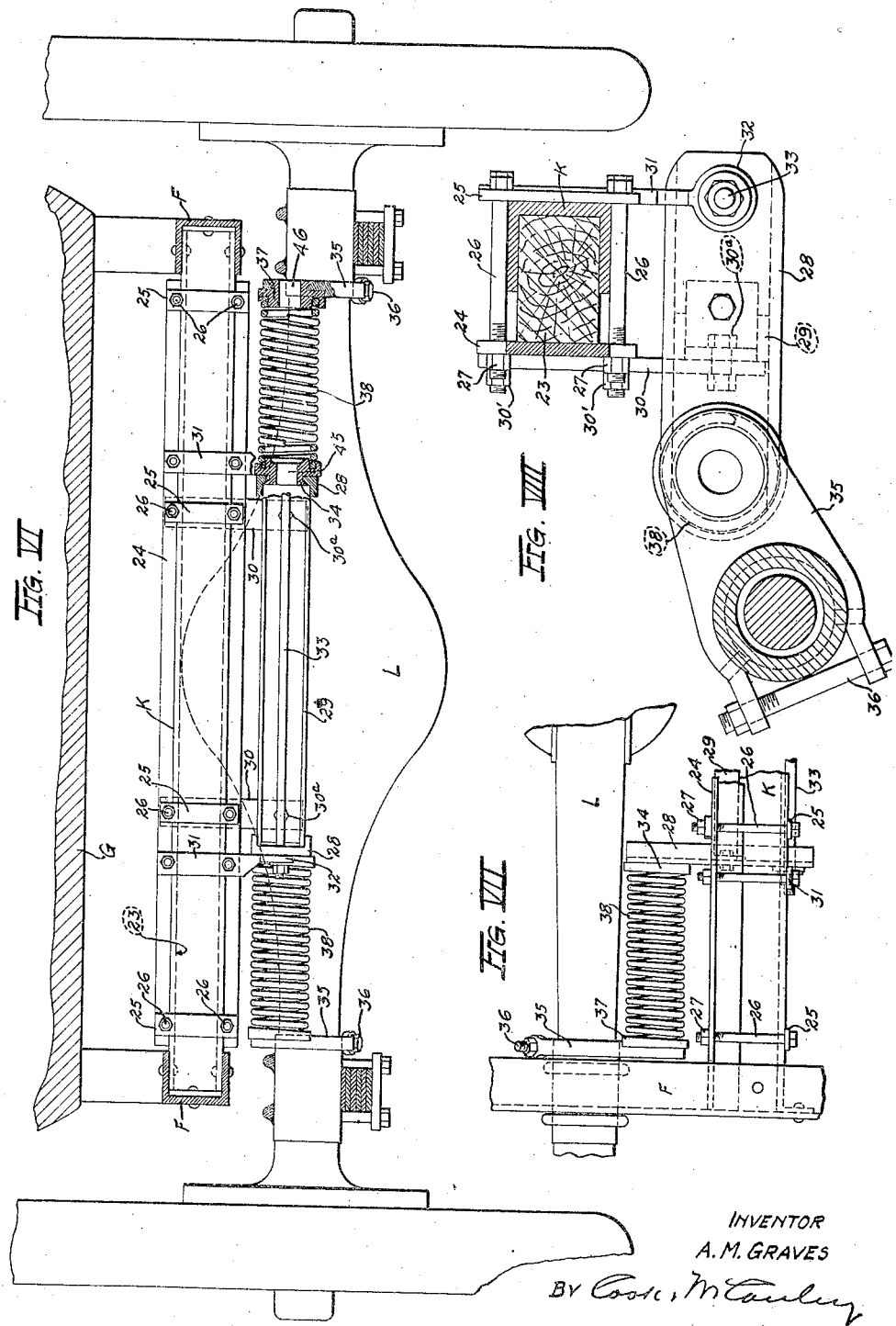

Patented June 1, 1926.

1,587,116

UNITED STATES PATENT OFFICE.

ALBERT M. GRAVES, OF ST. LOUIS, MISSOURI.

SHOCK ABSORBER FOR VEHICLES.

Application filed January 26, 1925. Serial No. 4,763.

This invention relates generally to shock absorbers for vehicles, and particularly to a shock absorber for a motor vehicle having a body which is resiliently supported with respect to the axles of said motor vehicle, whereby the shocks which ordinarily occur during the rebound of the common vehicle springs are reduced in number and intensity.

As is well known, vehicle springs of the types used on motor vehicles are necessarily extremely resilient so that the occupants of the vehicles may be afforded the maximum amount of comfort while said vehicles are traveling over roads of only ordinary smoothness, and while said extremely resilient springs function in a highly successful manner under the conditions mentioned, a disadvantage arises in connection therewith when an unusually deep rut or high, upstanding obstruction is encountered. Under such circumstances the highly resilient springs are suddenly actuated by the unusual shock and said springs immediately recoil, whereby the bodies of the vehicles are caused to bob up and down in a violent manner with the resultant discomfort to the occupants.

The object of the present invention, therefore, is to reduce the number and minimize the intensity of the shocks which result from the recoil of the springs of a vehicle whereby the inconveniences recited above are reduced to a minimum.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a view, partly in front elevation and partly in section, of a fragment of the forepart of a motor vehicle showing my improved shock absorber associated therewith.

Fig. II is a section on a reduced scale taken on the line II—II of Fig. I.

Fig. III is a fragmentary plan view showing the bracket by means of which the spring of my improved shock absorber is attached to the front axle of a motor vehicle.

Fig. IV is a section on a reduced scale taken on the line IV—IV of Fig. I.

Fig. V is a longitudinal section through my shock absorber showing the manner in which the spring of said shock absorber is retained under compression while the shock absorber is not attached to a motor vehicle.

Fig. VI is a view, partly in section and partly in rear elevation, of the rearmost portion of a motor vehicle equipped with my improved shock absorbers.

Fig. VII is a fragmentary plan view of a portion of the mechanism shown in Fig. VI.

Fig. VIII is an enlarged detail, partly in section and partly in elevation, showing the manner of attaching my shock absorber to the vehicle at the rear thereof.

In Fig. I of the drawings A designates the front axle of a motor vehicle, which axle is provided at each end with the usual steering knuckle B having an extending steering spindle C on which a wheel (not shown) is mounted. The view mentioned shows one end only of the front axle A, but it is to be understood that the parts shown are duplicated at the opposite end of said axle. The body of the motor vehicle is resiliently supported by the usual leaf springs D at the front of said vehicle, said leaf springs being supported by the front axle and being secured thereto by means of U-bolts E. The frame, or chassis, of the motor vehicle includes channel members F which extend longitudinally of the motor vehicle, there being one of these channel members F at each side of said motor vehicle, and said channel members F constituting the support for the body G of the vehicle, as shown in Fig. VI. H designates a portion of the radiator of the motor vehicle which rests on a transverse bar J having its opposite ends secured to the channel members F. All of the parts thus far described are to be found in many motor vehicles as now constructed, and as the construction and function of these parts are well known, they will not be described further herein. All that need be known to obtain a clear understanding of the present invention is that the channel members F and the vehicle body supported thereby are resiliently supported with respect to the axle A, and that said channel members and body and said axle may move vertically with respect to each other.

1 designates a coil spring which is interposed under a high degree of compression between a pair of oppositely disposed spring seats 2 and 3, each of the oppositely disposed spring seats being provided with a central boss 4 which extends into the spring 1, and each of said spring seats having a marginal flange 5 which is turned inwardly in the manner illustrated in Fig. I to firmly grip the adjacent end of the spring. It is apparent from this that the opposite ends of the spring 1 are rigidly secured to the oppositely disposed spring seats. The spring seat 2 is secured to the channel member F and the spring seat 3 is secured to the front axle A of the vehicle. By referring to Figs. I and II it will be seen that the spring seat 2 is associated with a plate 6, which is preferably triangular in shape. The spring seat 2 and the triangular plate 6 are preferably formed separately and said spring seat is provided with a projecting portion 7, which is extended through an aperture 8 in the plate 6, after which the end portion of said projecting portion 8 is upset to rivet said spring seat and said plate together.

Located at the corners of the triangular plate 6 are apertures 9 through which bolts 10 are passed, the ends of said bolts being provided with threaded portions 11 which extend through apertures in a plate 12 arranged at the side of the channel member F and opposite to the side adjacent to which the plate 6 is arranged. Screwed on the threaded portions of the bolts 10 are nuts 13 which bear against the plate 12. It is apparent from the foregoing that when the parts associated with the spring seat 2 are assembled as described, and the nuts 13 are screwed tightly against the plate 12, the plates 6 and 12 will be drawn very firmly against the opposite sides of the channel member F, whereby said spring seat 2 is retained in a fixed position on said channel member. A decided advantage in connection with the use of the spring seat attached to the chassis in the manner just described arises from the fact that it is not necessary to drill holes in the channel member F to receive attaching bolts, as has often been the case heretofore, and because of the elimination of these holes the labor required to apply the shock absorbers to a vehicle is greatly reduced.

Referring now to the spring seat 3 (Fig. I), it will be seen that the spring seat proper is provided with a projecting portion 14 similar to the projecting portion 8 of the spring seat 2 and that said projecting portion 14 passes through an aperture 15 in a plate 16. The outer end portion of the projecting portion 14, after it has been passed through the aperture 15, is upset to securely rivet the spring seat 3 to the plate 16. Referring now to Fig. III, it will be seen that the plate 16 is provided with marginal flanges 17 which extend longitudinally of the side marginal edges of said plate, there being one of said flanges at each side edge of said plate. 18 designates a pair of oppositely disposed plates which are arranged at the opposite side edges of the plate 16, said plates 18 having each a vertically arranged groove 19 into which the flanges 17 extend, as shown clearly in Fig. III.

The front axle A of the vehicle is provided with laterally extended flanges A', and each of the plates 18 is provided with an inwardly extended lug 20 which is so shaped and arranged that it will fit beneath one of said flanges, as shown in Figs. I and IV. Extended through apertures in the plates 18 is a pair of bolts 21, said bolts being arranged immediately above and in contact with the top face of the axle A, and each of said bolts having a head at one of its ends and a nut at its other end. It is apparent that when the oppositely disposed plates 18 are drawn toward each other by the manipulation of the nuts on the bolts 21, said plates will tightly grip the axle A, and because the flanges A' on the axle A are gripped between the lugs 20 on the plates 18 and one of the bolts 21, it is plain that said plates may not become disengaged from the axle A while the bolts are in place. Also by referring to Fig. I it will be seen that the uppermost bolt 21 is located adjacent to a curved portion of the axle A and it is therefore not possible for the plates 18 to slide downwardly along the flange A' of the axle. By referring to Fig. III it will be noted that the axle A tapers toward the steering knuckles B, and to retain the plates 18 in positions at right angles to the plate 16 I provide said plates with comparatively short lugs 22 which are adapted to contact with said axle, as shown clearly in the view mentioned.

To understand the action of the shock absorber disclosed herein, it will be important to observe that there is a spring 1 at each side of the motor vehicle at the front thereof, and that these springs are assembled between their spring seats under a very high degree of compression so that their tendency to expand exerts a very considerable force. However, these springs 1 normally lie in the horizontal position shown by full lines in Fig. I and therefore merely oppose each other without actually displacing any part of the structure. Assume now that the front wheels of the vehicle strike an obstruction which causes the body of the vehicle to be thrown upwardly. This will cause the channel members F to move from the position in which the single channel member shown in Fig. I is shown by full lines to the position shown by dotted lines, and the spring 1 will be inclined upwardly from the spring seat 3 to the spring seat 2. Since the spring is normally under a high degree of compression, it will exert an upward thrust when positioned as shown by dotted lines in Fig. I, and this upward thrust will retard the return motion of the vehicle body. During the return motion the vehicle body moves downwardly and such downward movement is yieldingly opposed by the upwardly inclined spring 1.

When the body of the vehicle is forced downwardly or toward the axle A, or when said axle A is forced toward the vehicle body, the spring 1 will be displaced to the lowermost position shown by dot and dash lines in Fig. I, where it is inclined downwardly from the spring seat 3 to the spring seat 2. When the spring is positioned as suggested it exerts a downward thrust against the vehicle body, whereby the return upward movement of said vehicle body is yieldingly opposed by the downwardly inclined spring 1.

It is apparent from the foregoing, therefore, that this device comprises a normally ineffective spring 1 adapted to occupy a horizontal position which may be regarded as the neutral position, for it then performs no useful function. When the body of the vehicle is moved upwardly or downwardly this spring is displaced to positions where it exerts upward or downward thrusts, which tend to retard the return motion of the body. To accomplish these results the spring must be under a high degree of compression and its opposite ends must be secured to the axle and the vehicle body of the vehicle, respectively. An important advantage is obtained by having the ends of the springs rigidly associated with the body and axle, respectively, so that each spring is bent transversely between its ends in response to the upward and downward motions of the body and axle.

The construction of the rearmost portion of a motor vehicle chassis is usually quite different from the construction of the forward portion thereof, and this difference necessitates a change in the arrangement and construction of my shock absorber. However, the rearmost portion of the motor vehicle, like the forward portion thereof, is provided with a pair of coil springs, each of which is arranged under high compression between oppositely disposed spring seats, and these spring seats are secured to the body of the vehicle and to the rear axle thereof, respectively. Like the springs arranged at the front of the vehicle, the springs at the rear thereof are opposed to each other, and when in their neutral positions these springs are ineffective, but when displaced said springs exert upward or downward thrusts against the vehicle body.

Arranged at the rearmost end of the chassis of the motor vehicle is a channel bar K, the opposite ends of which are supported by the oppositely disposed channel members F (Figs. VI, VII and VIII). The channel bar K is riveted or otherwise secured to the channel bars F, as suggested in Fig. VI. Arranged within the channel bar K is a member 23 which extends longitudinally of said channel bar from end to end thereof, said member preferably being in the form of a wooden bar and said wooden bar being of greater width than said channel bar K so that it extends beyond an edge of said channel bar in a transverse direction, as shown in Fig. VIII. Arranged in contact with the outer side face of the bar 23 is a plate 24 which extends longitudinally of the channel bar K from end to end thereof, and arranged in contact with the rearmost face of the channel bar K is a plurality of vertical bars 25. Each of the vertical bars 25 is provided with an aperture adjacent to its upper end and an aperture adjacent to its lower end, and the plate 24 is provided with similar apertures which are arranged in horizontal alinement with the apertures in the vertical bars 25. Extended through the apertures in the plate 24 and the apertures in the vertical bars 25 are bolts 26 provided with nuts 27 on their threaded end portions. It is apparent from the arrangement shown and described that the plate 24 and the vertical bars 25 may be caused to tightly grip the channel bar K and the longitudinal bar 23 when said nuts 27 have been screwed inwardly on the bolts 26.

28 designates a pair of comparatively short channel bars which extend longitudinally of the motor vehicle and are spaced apart from each other in a direction transverse with respect to the vehicle. The channel bars 28 are connected together by a channel bar 29, the opposite end portions of said channel bar 29 being provided with flanges through which bolts are passed into the channel bars 28 whereby said channel bars 28 and 29 are secured together. 30 designates a pair of vertical bars which are clamped to the channel bar K by means of bolts 30', the lower end portions of said vertical bars 30 being secured to the channel bar 29 by means of bolts 30$^a$ whereby said channel bar 29 and the associated channel bars 28 are supported. 31 designates vertical bars which are clamped to the channel bar K in the same manner as are the vertical bars 25, said vertical bars 31 being each provided at their lower ends with a circular portion 32 which is arranged in contact with one of the channel bars 28. 33 designates a tie rod, the opposite ends of which are extended through openings in said channel bars 28 and said circular portions 32 of the vertical bars 31, and said tie rod is provided with nuts which bear against the outer faces of said circular portions 32. Secured to each of the channel bars 28 at its forward end is a spring seat 34, said spring seat preferably being riveted to said channel bar in the same manner that the spring seats 2 and 3 are secured to their supporting members.

35 designates members which are adapted to be clamped to the rear axle housing L of the motor vehicle, said members 35 each having a bifurcated portion adapted to straddle said axle housing and having a bolt 36 by means of which the legs of said bifurcated portion may be drawn together to clamp said member on said axle housing. Riveted or otherwise secured to the opposite end of each member 35 is a spring seat 37 similar to the spring seat 34 already described.

By referring to Fig. VI it will be seen that the individual spring seats of each associated pair of spring seats are spaced apart from each other in a horizontal direction, and that a coil spring 38 is interposed between each associated pair of spring seats. The coil springs 38, like the coil springs 1, already described, are interposed between their seats under a high degree of compression so that their tendency to expand exerts considerable force. It will be noted that these springs are normally arranged in horizontal positions so that they do not displace any part of the structure but merely oppose each other.

The action of the shock absorbers at the rear of the axle is exactly the same as the action of the shock absorbers at the front of the vehicle, for when the body of the vehicle is thrown upwardly the springs 38 will be inclined upwardly from the spring seats 37 to the spring seats 34, and since said springs are under a high degree of compression they will exert an upward thrust which will retard the downward movement of the vehicle body. On the other hand, when the vehicle body is forced toward the axle or the axle is forced toward the vehicle body, the springs 38 will be inclined downwardly from the spring seats 37 to the spring seats 34, which will cause the springs to exert downward thrusts which will retard the return upward movement of the vehicle body.

It is, of course, desirable to assemble my shock absorber at the factory, and to sell it in an assembled condition, and because the coil spring is interposed between its seats under a high degree of compression some means must be employed to maintain said coil spring in its compressed condition. In addition to the desirability of marketing the shock absorber in an assembled condition, safety requires that some means be employed to harness the great power stored up in the spring when a shock absorber is being applied to or removed from a vehicle. I therefore employ the means illustrated in Fig. V, in which view a pair of spring seats 2 and 3 are shown between which a coil spring 1 is interposed under a high degree of compression. The spring seat 3 is provided with a smooth central opening 40 formed therethrough and the spring seat 2 is provided with an internally-threaded central opening 41. 42 designates a rod which is adapted to be passed through the smooth opening 40 in the spring seat 3 and extended longitudinally through the coil spring 1, as shown in Fig. V. The rod 42 is provided with a threaded end portion 43 adapted to be screwed into the internally-threaded opening 41 in the spring seat 2, and said rod is provided at its other end with a threaded portion on which is screwed a nut 44 which bears against the outer face of the plate 16 associated with the spring seat 2. It is apparent when the threaded end portion 43 of the rod 42 is screwed into the internally-threaded opening 41 in the spring seat 3 and the nut 44 is in contact with the plate 16, that the springs seats 2 and 3 will be prevented from moving away from each other and the spring will therefore be retained in its compressed condition, thus permitting the shock absorber to be handled with perfect safety. While I have shown the rod 42 in Fig. V associated with the spring seats 2 and 3, it is apparent that a similar rod may be associated with the spring seats 34 and 37, but because said spring seats 34 and 37 are provided with central openings 45 and 46, respectively, which are larger in diameter than the central openings 40 and 41, washers will have to be used with said spring seats 34 and 37 to prevent said rod from passing through said openings 45 and 46.

I claim:—

1. In combination with a vehicle having an axle, a body and resilient means for supporting said body, a shock absorber, said shock absorber comprising a spring seat associated with said axle, means for rigidly clamping said spring seat to said axle, a spring seat associated with said vehicle body, means for rigidly clamping said spring seat in place, and a spring interposed between said spring seats and having its ends rigidly secured thereto, said spring being normally arranged in a substantially horizontal position where it exerts no upward and downward pressure against said vehicle body and being moved when the body of the vehicle is displaced vertically to positions where it exerts upward and downward pressure against said vehicle body.

2. A shock absorber for a vehicle having an axle, a body and resilient means supporting said body, said shock absorber comprising a spring under compression, means whereby one end of said spring is rigidly connected to the axle, and means whereby the other end of the spring is rigidly connected to said body, said spring being normally arranged in a neutral position wherein it transmits no substantial upward or downward pressure to the body, and said spring being free to expand in response to upward and downward movements of the body and axle.

3. A shock absorber for a vehicle having an axle, a body and resilient means supporting the body, said shock absorber comprising a spring confined under pressure and adapted to expand in response to both upward and downward movements of the body relative to the axle, one end of said spring being rigidly connected to the axle and the other end being rigidly connected to the body, said ends being in different vertical planes so that vertical displacement of either the body or axle will permit expansion of the compressed spring, and said spring being free to bend transversely between its rigidly connected ends in response to said vertical displacement.

4. A shock absorber for a vehicle having an axle, a body and resilient means supporting the body, said shock absorber comprising stressed springs at opposite sides of the body of the vehicle, means whereby one end of each spring is rigidly connected to the body, means whereby the other end is rigidly connected to the axle, said springs being normally under compression in substantially horizontal positions where they oppose each other without exerting any substantial upward or downward pressure against the vehicle body, and said springs being free to bend transversely and to expand in response to vertical displacement of the body and axle, so as to yieldingly oppose the return motions of the body and axle.

5. A shock absorber for a vehicle having an axle, a body and resilient means supporting said body, said shock absorber comprising a spring confined under pressure and adapted to expand in response to both upward and downward movements of the body relative to the axle, one end of said spring being rigidly associated with the axle and the other end being rigidly associated with the body, said ends being in different vertical planes so that vertical displacement of either the body or axle will permit expansion of the compressed spring, and said spring being free to bend transversely between its ends in response to said vertical displacement.

In testimony that I claim the foregoing I hereunto affix my signature.

ALBERT M. GRAVES.